United States Patent

Hachino et al.

[11] Patent Number: 5,987,419
[45] Date of Patent: Nov. 16, 1999

[54] AUTOMATIC SECURITIES EXCHANGE SYSTEM WHICH DETECTS COMMUNICATIONS ERRORS AND ALLOWS CANCELLATION OF ORDERS

[75] Inventors: Takashi Hachino, Kawasaki; Yoichi Kato; Yasuhide Yamamoto, both of Tokyo, all of Japan

[73] Assignee: Fujitsu Limited, Kawasaki, Japan

[21] Appl. No.: 08/214,754

[22] Filed: Mar. 18, 1994

[30] Foreign Application Priority Data

Apr. 16, 1993 [JP] Japan .................................. 5-089740

[51] Int. Cl.$^6$ .......................... G06F 153/00; G06F 13/14
[52] U.S. Cl. ............................................ 705/1; 340/825.29
[58] Field of Search .................................. 364/401, 408, 364/265.25, 737, 184.01, 185.01, 185.02, 200.13; 395/201, 237, 610; 340/825–52, 825.16, 825.29; 705/1, 37, 26; 379/100.06; 235/382

[56] References Cited

U.S. PATENT DOCUMENTS

| | | | |
|---|---|---|---|
| 4,412,287 | 10/1983 | Braddock | 364/408 |
| 4,823,265 | 4/1989 | Nelson | 364/408 |
| 5,077,665 | 12/1991 | Silverman et al. | 364/408 |
| 5,297,031 | 3/1994 | Gutterman et al. | 364/408 |
| 5,305,200 | 4/1994 | Hartheimer et al. | 364/408 |

FOREIGN PATENT DOCUMENTS

| | | |
|---|---|---|
| 0 469 168 | 2/1992 | European Pat. Off. . |
| 2-257354 | 10/1990 | Japan . |
| 2 180 380 | 3/1987 | United Kingdom . |

OTHER PUBLICATIONS

Computer Architecture & Organization; Hayes, John P. ; 1988 pp. 44–45; 491–497; 664–670.

*Primary Examiner*—Frantzy Poinvil
*Attorney, Agent, or Firm*—Staas & Halsey LLP

[57] ABSTRACT

An electronic dealing system including a host system and a plurality of terminal systems and electronically performing matching processing of information on transaction orders placed by the order side customers and information on transactions placed by hit side customers so as to establish a transaction, wherein the host system is provided with a first detecting unit for detecting the occurrence of a fault in a communication system with a terminal system and a canceling unit for canceling orders of order side customers issued from a terminal system connected to that communication system when said first detecting unit detects that a fault in the communication system has occurred.

17 Claims, 14 Drawing Sheets

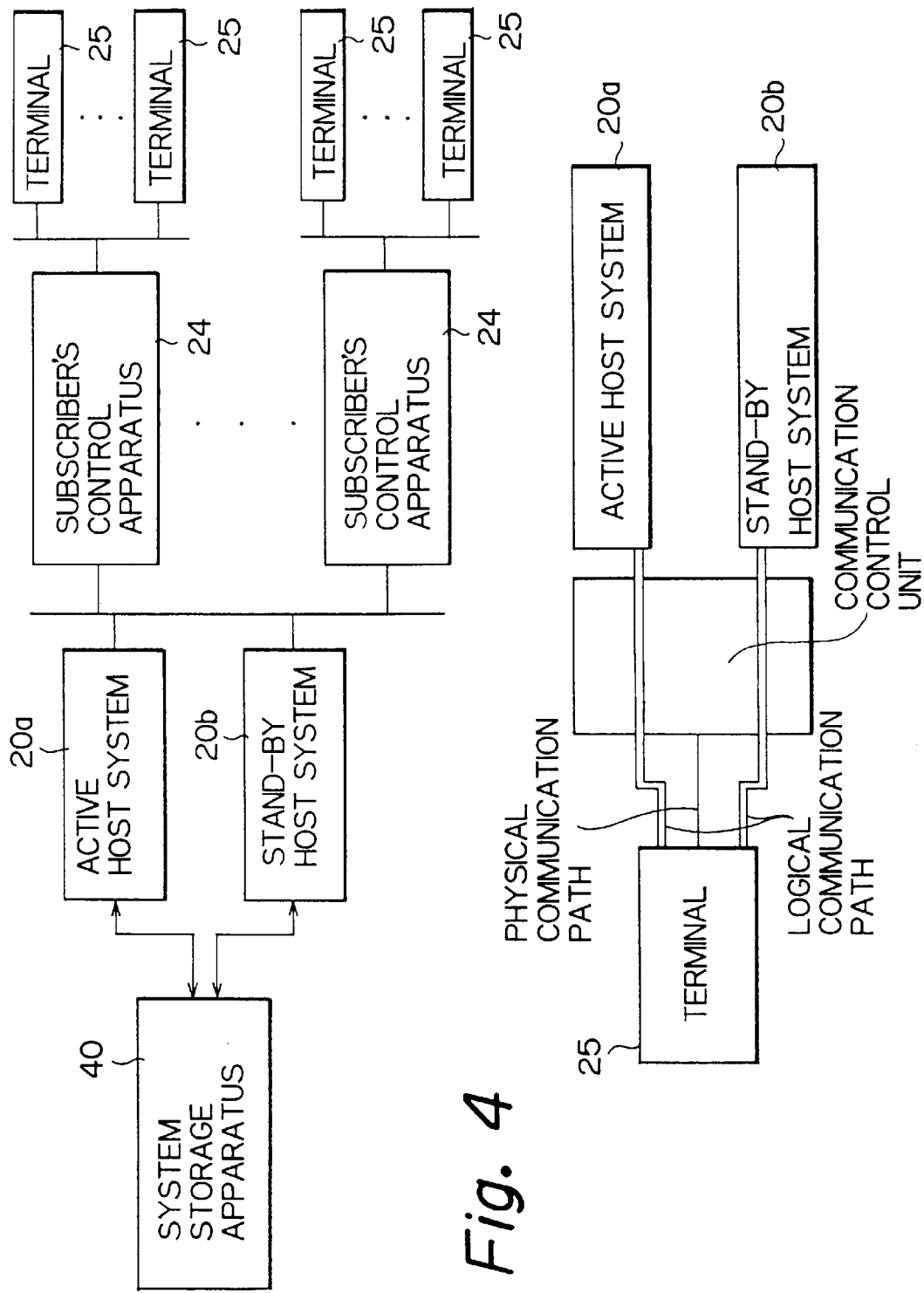

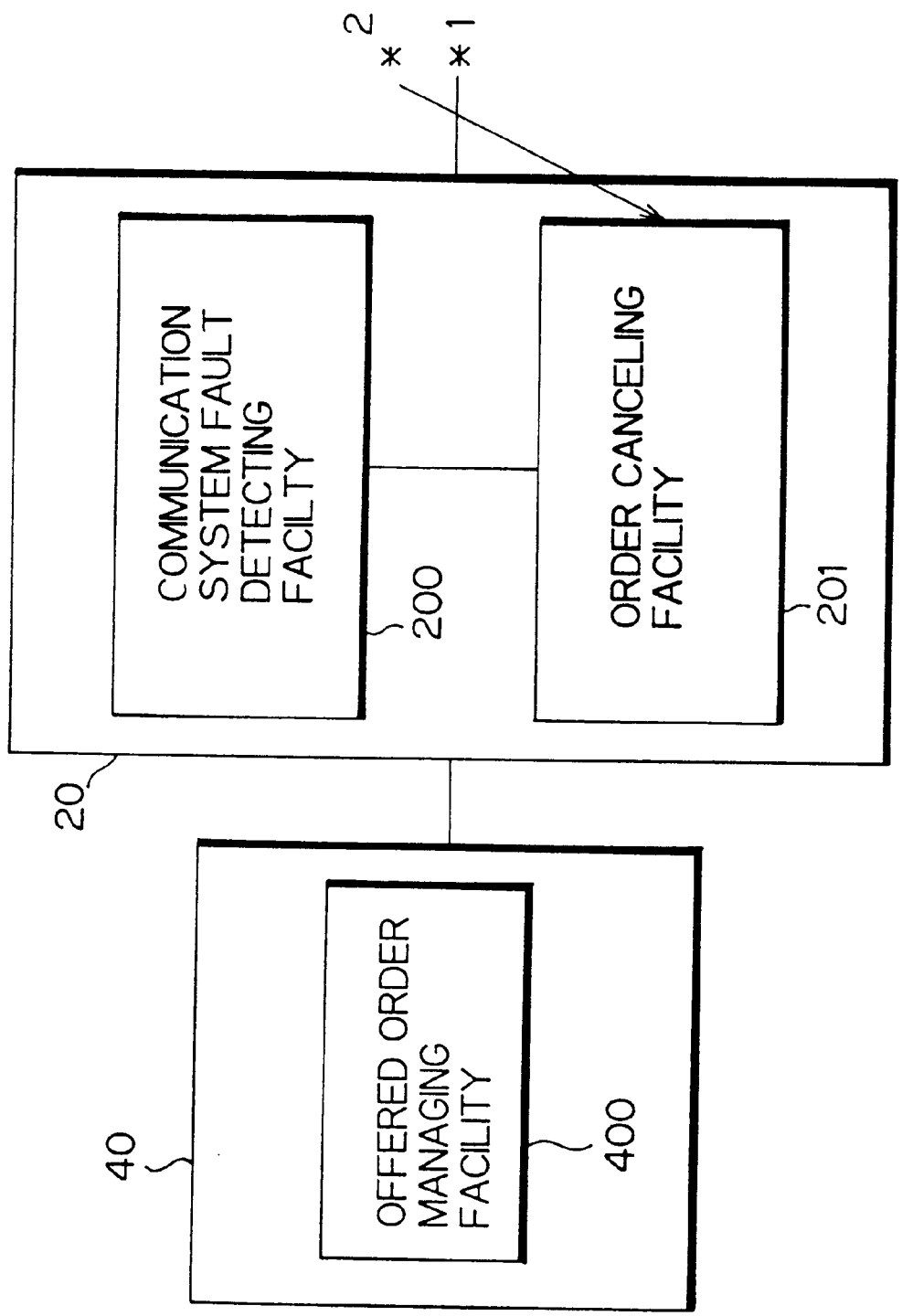

AUTOMATIC SECURITIES EXCHANGE SYSTEM WHICH DETECTS COMMUNICATIONS ERRORS AND ALLOWS CANCELLATION OF ORDERS

BACKGROUND OF THE INVENTION

1. Field of the Invention

The present invention relates to an electronic dealing or transacting system which electronically performs matching processing of information on transaction orders placed by order side customers and information on transactions placed by hit side customers so as to establish transactions, more particularly relates to an electronic dealing system which protects customers against disadvantageous transactions and even if some fault occurs.

In an electronic dealing system which handles foreign exchange etc., matching processing is performed electronically between information on transaction orders placed by the order side customers and information on transaction orders placed by the hit side customers so as to establish transactions. To make such an electronic dealing system practical, it is necessary to construct it so as to protect customers against disadvantageous transactions even if some fault occurs.

2. Description of the Related Art

The electronic dealing system to which the present invention is applied has the general configuration shown later in FIG. 13.

In such an electronic dealing system, customers using a terminal system which suffers from a fault in the communication system are sometimes forced to honor disadvantageous transactions.

More specifically, when a fault occurs in the communication system, the customer is unable to cancel orders he has placed and therefore the offered order remains valid as is in the host system. If the market were to change by a large extent at that time due to some news-making event, a transaction would be established against the customer's will and he would be forced to honor a disadvantageous transaction.

SUMMARY OF THE INVENTION

The present invention was made in consideration of the above circumstances and has as its object the provision of a new electronic dealing system which electronically performs matching processing of information on transaction orders placed by order side customers and information on transactions placed by hit side customers so as to establish transactions and which protects customers against disadvantageous transactions even if some fault occurs.

To attain the above object, the present invention provides detecting means for detecting the occurrence of a fault in a communication system with a terminal system and canceling means for canceling orders of order side customers placed from the terminal system connected to that communication system.

BRIEF DESCRIPTION OF THE DRAWINGS

The above object and features of the present invention will be more apparent from the following description of the preferred embodiments with reference to the accompanying drawings, wherein:

FIG. 3 is a view for explaining a hierarchical structure of the electronic dealing system;

FIG. 4 is a view for explaining a communication path;

FIGS. 8A, 8B, and 8C are views of the configuration of an electronic dealing system according to the present invention;

DESCRIPTION OF THE PREFERRED EMBODIMENTS

Figure 13:
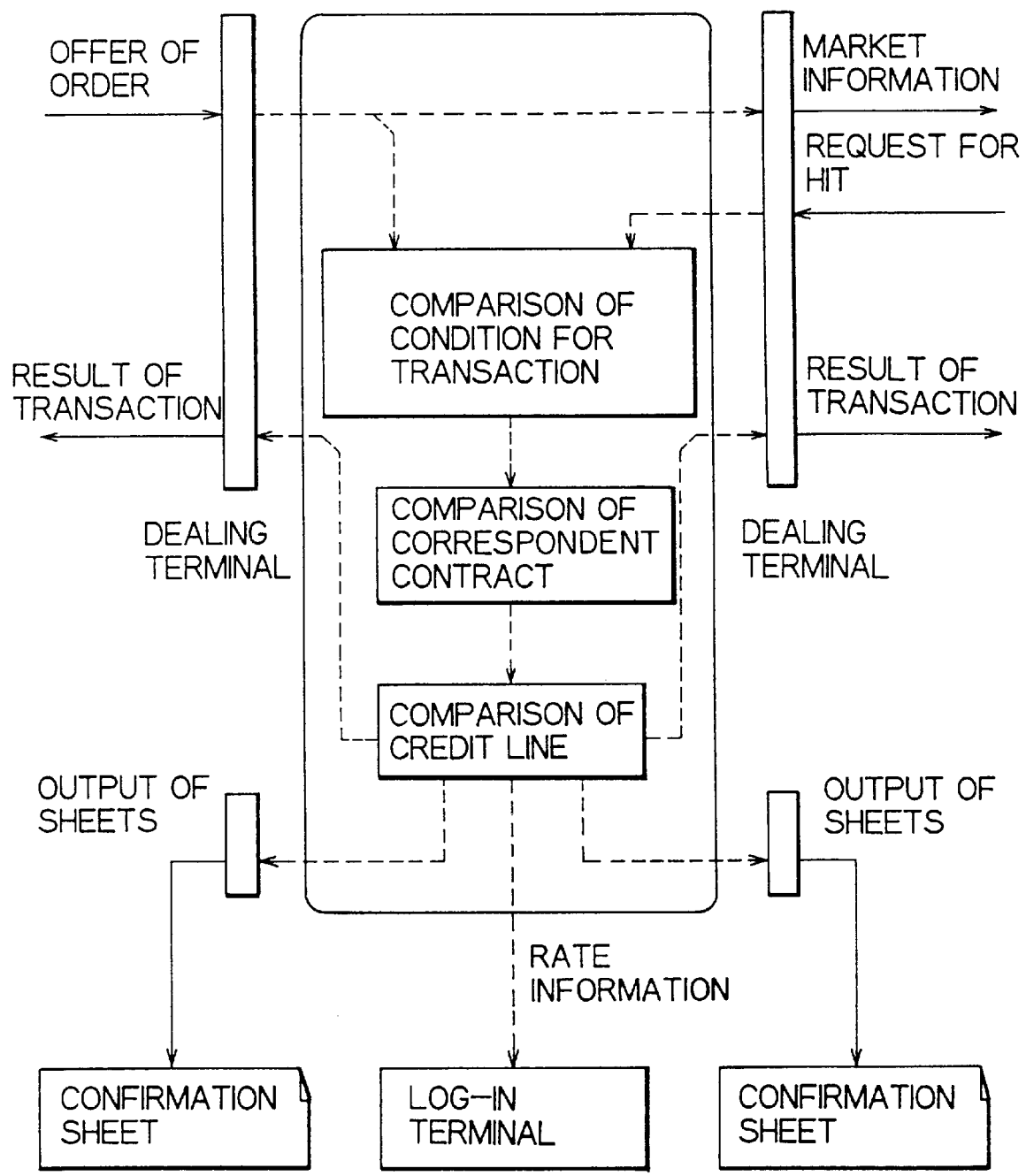
FIG. 13 is a view generally explaining an electronic dealing system to which the present invention is applied.

First, referring to FIG. 13, in an electronic dealing (i.e., transaction) system to which the present invention is applied, when an order side customer places a transaction order through a dealing terminal, the market information (rate information) is notified to the hit side customers through the dealing terminal. When in response to the notification there is a request for a hit of the transaction order from a hit side customer, first electronic matching processing is executed so as to compare the terms of the transaction of the offered order and the terms of the transaction of the hit request.

When it is judged by this comparison that the terms of the respective transactions (price of transaction and amount of transaction) match, the correspondent agreements are compared. That is, it is checked if each of the parties concluding the agreement is able to do business. If it is judged by this comparison that each is able to do business, the credit lines are then compared. That is, it is checked if the amount of the transaction is inside the credit lines.

If it is judged as a result of this comparison that the amount is inside the credit lines, the transaction is established; accordingly, confirmation sheets of the transaction are output to the order side customer and the hit side customer and the changed market information is displayed on the log-in terminal.

In the electronic dealing system of FIG. 13 for performing this processing, if a configuration is adopted in which orders placed by the order side customers are not canceled even if a fault occurs in the communication system between the host computer and a terminal system, but are treated as remaining valid, then, as mentioned earlier, if a fault should occur in the communication system, then the problem might arise of customers not being able to be protected against disadvantageous transactions. Therefore, the present invention proposes the following configuration.

Figure 1:
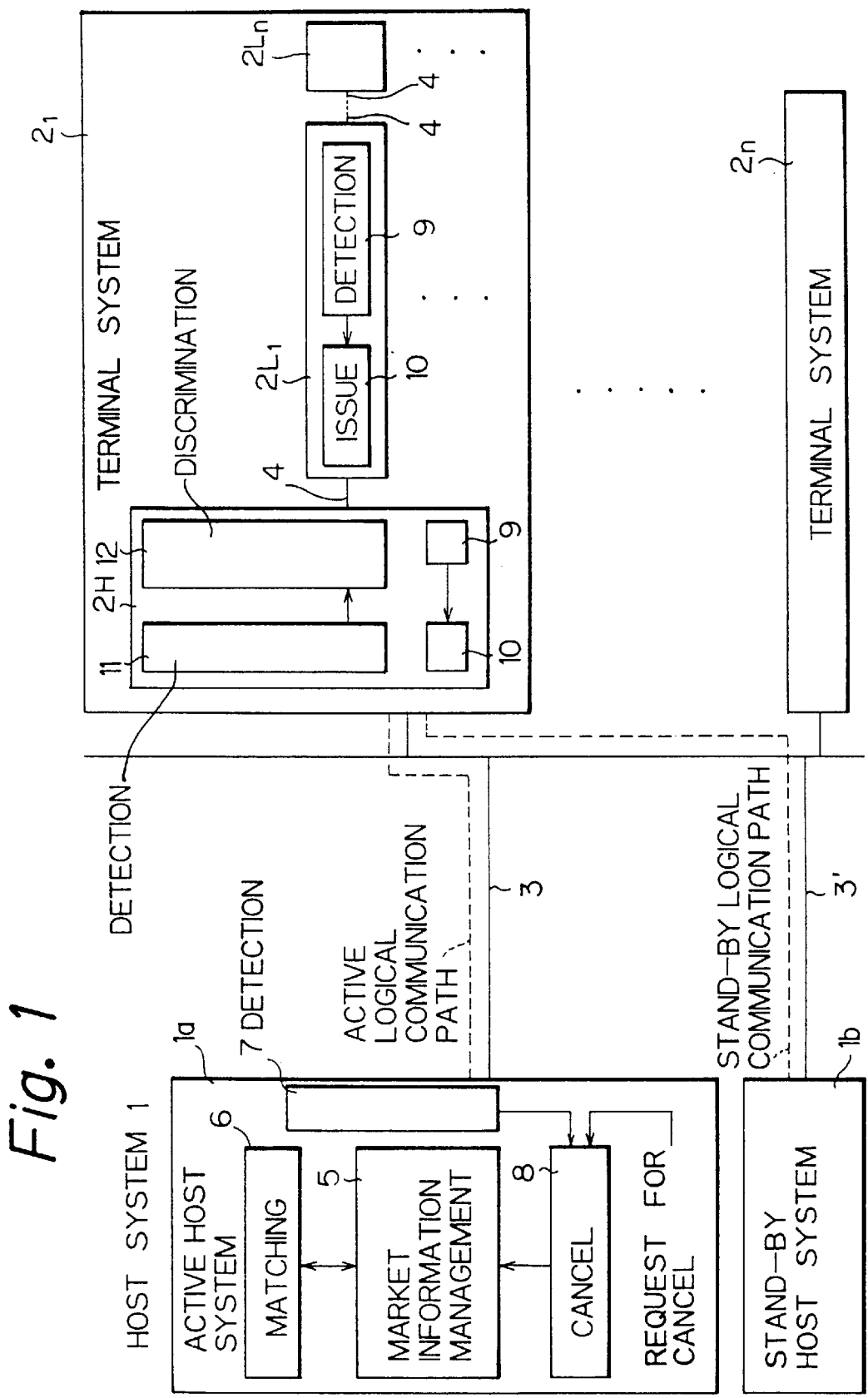
FIG. 1 is a view of the basic configuration of the present invention.

FIG. 1 is a view of the basic configuration of the present invention.

In the figure, 1a is an active host system constituting the electronic dealing system of the present invention, and 1b is a stand-by host system constituting the electronic dealing system of the present invention. A duplex construction is therefore adopted. These systems perform matching processing between the information on transaction orders placed by order side customers and information on transaction orders placed by hit side customers so as to establish transactions between the two parties. Reference numerals $2_n$ (n=1, . . . ) identify a plurality of terminal systems constituting the electronic dealing (i.e., transaction) system 1. Each terminal system $2_1, \ldots 2_a$ has an hierarchical structure and is connected over active and stand-by logical communication paths 3 and 3' to the host system 1. Within a given terminal system $2_n$, a higher terminal unit 2H is connected through a succession of communication lines 4 to plural lower terminal units $2L_1$ to $2L_n$. The terminal unit 2H at the left side is the higher terminal unit 2H, while each of the terminal units $2L_n$ to the right side thereof is a lower terminal unit.

The host system 1 is provided with a market information managing unit 5 for managing information on orders placed by order side customers, a matching unit 6 for executing processing for matching orders placed by order side customers and requests for hits placed by hit side customers, a detecting unit 7 for detecting the occurrence of a fault in a communication path 3 or 3' connecting to the terminal systems $2_1$ to $2_n$, and a canceling unit 8 for canceling orders registered in the market information managing unit 5.

On the other hand, the higher terminal unit 2H at the higher side of each terminal system $2_n$ and each of the lower terminal units $2L_1$ to $2L_n$ $2L_1$, . . . $2L_n$, is provided with a respective detection unit 9 which detects the occurrence of a fault, e.g., a disabled communication, in the successive communication lines 4 respectively connecting the lower terminal units $2L_n$ with the higher terminal unit 2H and an issuing unit 10 which issues to the host system 1 a request for cancellation of an offered order. Further, the higher terminal unit 2H connected to the host system 1 is provided with a detector 11 which detects the occurrence of a fault, e.g., a disabled communication, in the communication path 3 to the host system 1 and a discriminating unit 12 which discriminates the class, or type, of fault producing the state of disablement in the communication path 3 detected by the detecting unit 11.

The detecting means 7 provided in the host system 1 detects the occurrence of a fault in the communication system on the basis of a response at the time of processing for communication with the terminal system 2, continues to monitor the duration of non-issuance of an event from the terminal system 2 (duration of state where no signal is received from the terminal system 2), and transmits an inspection signal to the terminal system 2 when that duration is over a predetermined time. By adopting this construction, it detects a fault in the communication system based on the response to the transmission.

In this way, if the occurrence of a fault in the communication system between the host system 1 and a terminal system 2 is detected, the canceling means 8 cancels the offered orders of the order side customers issued from the terminal system 2 connected to the faulty communication system.

On the other hand, the detecting means 9 provided in the terminal system 2 detects the occurrence of a fault in the communication system on the basis of a response at the time of processing for communication with the lower terminal system 2 (right side in the figure). It monitors the duration of the non-issuance of an event from the lower terminal system 2 and sends an inspection signal to the lower terminal system 2 when the duration is over a predetermined time. It detects a fault in a communication system based on the response to the transmission.

In this way, when the occurrence of a fault in the communication system with the lower terminal system 2 is detected, the issuing means 10 issues a request to the host system 1 to cancel the offered orders from order side customers issued from the lower terminal system 2 connected to the faulty communication system. Receiving this, the canceling means 8 of the host system 1 cancels the offered orders.

In this way, the present invention is constituted so that when a fault occurs in a communication system constituting the electronic dealing system, the offered orders of order side customers registered through that communication system are automatically canceled. Thus, order side customers placing offered orders are no longer forced to honor disadvantageous transactions even if there are news-making events.

Further, when realizing this construction, since the detecting means 7 and 9 detect the occurrence of faults in the communication system by monitoring the duration of non-issuance of events from the lower side and sending an inspection signal to the lower side when the duration is over a predetermined period, faults in the communication system can be accurately detected even if using an asynchronous balanced mode (ABM) communication protocol procedure not having such a function. Therefore, it becomes possible to use open system interface (OSI) communication using this ABM communication protocol routine as a standard.

Further, when realizing this construction, if the terminal system 2 were to manage offered order canceled at the host system 1, then it would become necessary to cancel those offered orders as well to maintain the match between the two systems. By providing the terminal system 2 connected to the host system 1 with the detecting means 11, it can detect if a fault has occurred in the communication system with the host system 1. By this, when a fault occurs, the terminal system 2 can also perform processing to cancel the offered orders canceled at the host system 1. On the other hand, when realizing this construction, in the case of a host system 1 of a duplex construction, there is a possibility that even when the detecting means 11 detects a disabled communication state, the fault is in the active host system 1 (at this time, the stand-by host system 1b takes over the processing, so the offered orders are not canceled), so there are cases where it cannot immediately be concluded that the communication system is faulty.

Accordingly, the terminal system 2 connected to the host system 1 is provided with a discriminating means 12. When a disabled communication state is detected by the detecting means 11, the discriminating means 12 sends a path confirmation message to the host system using the logical communication path of the stand-by system and discriminates based on the response to the transmission if the disabled communication state is due to a fault in the communication system or due to a fault in the active host system 1a. By this, even when the host system 1 is of a duplex construction, the terminal system 2 can accurately detect that a fault has occurred in the communication system with the host system 1. When realizing this construction, high speed processing becomes possible if the logical communication path of the stand-by system is established at the time of startup of the system.

Here, when it is judged by the discriminating means 12 that there is a fault in the communication system, since the offered orders are canceled at the host system 1, to maintain the match between the two systems, the offered orders are canceled by the terminal system 2 as well. On the other hand, when it is judged by the discriminating means 12 that the fault is in the active host system 1a, the stand-by host system 1b operates as the active system, so the offered orders in the host system 1 remain as they are without being canceled.

Below, the present invention will be explained in detail taking as an example an electronic dealing system handling foreign exchange.

Figure 2:
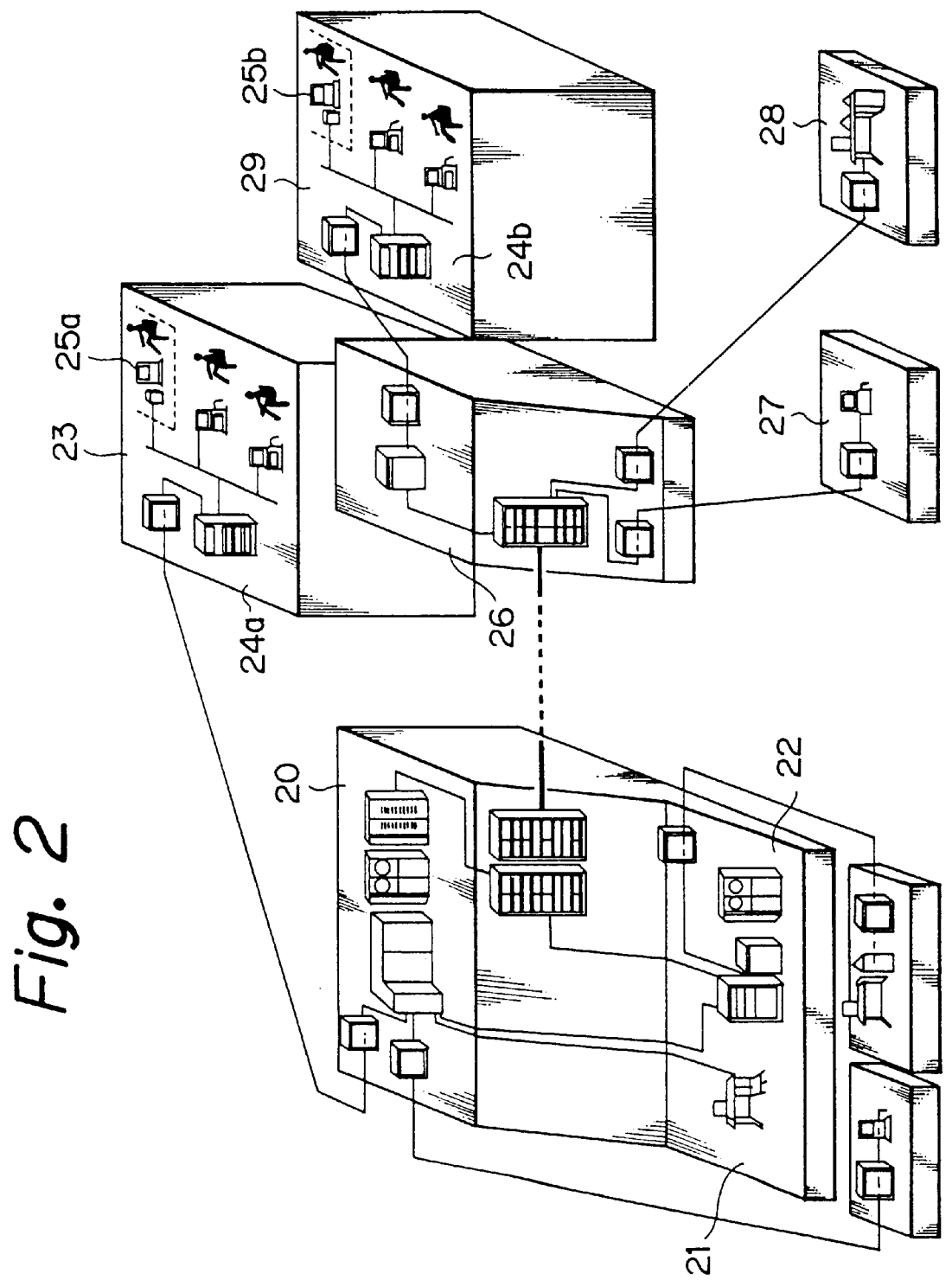
FIG. 2 is a view of an example of the configuration of an electronic dealing system to which the present invention is applied.

FIG. 2 is a view of an example of the configuration of an electronic dealing system handling foreign exchange to which the present invention is applied.

In the figure, 20 (1) is a host system which is constructed to manage the information on requests for transactions of foreign exchange issued from customers. It promotes the establishment of transactions for buying and selling foreign exchange by performing processing for matching two corresponding sets of request information. Reference numeral 21 is a monitoring system connected to the host system 20 which monitors the operation of the host system 20. Reference numeral 22 is a charging system connected to the host system 20 which processes service fees etc. for the established transactions. Reference numeral 23 is a customer system connected to the host system 20 which executes processing for interaction with customers. Reference numeral 24a (2) is a subscriber control apparatus (in the figure, sometimes shown as the management and distribution server (MDS)) which is provided in the customer system 23 and supports terminals under the customer system 23. Reference numeral 25a (2) is a terminal controlled by the subscriber control apparatus 24a and serves as the interactive means with the customers.

Reference numeral 26 is a subsystem provided overseas, for example, which supports the host system 20. Reference numeral 27 is a monitoring system connected to the subsystem 26 which monitors the state of operation of the host system 20 etc. Reference numeral 28 is a charging system connected to the subsystem 26 which processes the service fees etc. for established transactions. Reference numeral 29 is a customer system connected to the subsystem 26 which executes interactive processing with customers. Reference numeral 24b is a subscriber control apparatus (in the figure, sometimes shown as an MDS) provided in the customer system 29 which supports terminals under the customer system 29. Reference numeral 25b is a terminal which is controlled by the subscriber control apparatus 24b and serves as the interactive means with the customer. The apparatuses 24a and 24b are the already described higher terminal systems, while the apparatuses 25a and 25b are the already described lower terminal systems.

In this way, the electronic dealing system shown in FIG. 2 has a hierarchial structure as shown in FIG. 3 for example.

Here, the electronic dealing system of FIG. 3 has a duplex construction. Reference numeral 20a (1a) is an active host system operating as the active system, while 20b (1b) is a stand-by host system operating as the stand-by system. Reference numeral 40 is a system storage apparatus shared by the active host system 20a and the stand-by host system 20b. This system storage apparatus 40 stores various types of information required for the host business processing. The stand-by host system 20b takes over the information and operates as the active system when the active host system 20a is unable to continue processing.

Due to the duplex construction, as shown in FIG. 4, an active logical communication path is established between the active host system 20a (1a) and the terminal 25 (2), and a stand-by logical communication path is established between the stand-by host system 20b (1b) and the terminal 25 (2). If the active logical communication path is established, then the active host system 20a sends a message to the effect of being the active system to the path. By this, it is possible to confirm which of the host systems 20 (1) is the active system at the terminal 25 side.

Here, looking at the stand-by logical communication path, it is preferable to establish this at the time of startup of the stand-by host system 20b so as to execute the changeover from the active system to the stand-by system at a high speed. Note that to change over from the active host system 20a to the stand-by host system 20b, the active host system 20a cyclically records the time in a specific area of the system storage apparatus 40. The stand-by host system 20b executes the changeover by monitoring the state of the active host system 20a in accordance with this recorded time. A changeover is made when the recorded time is not incremented.

Figure 5:
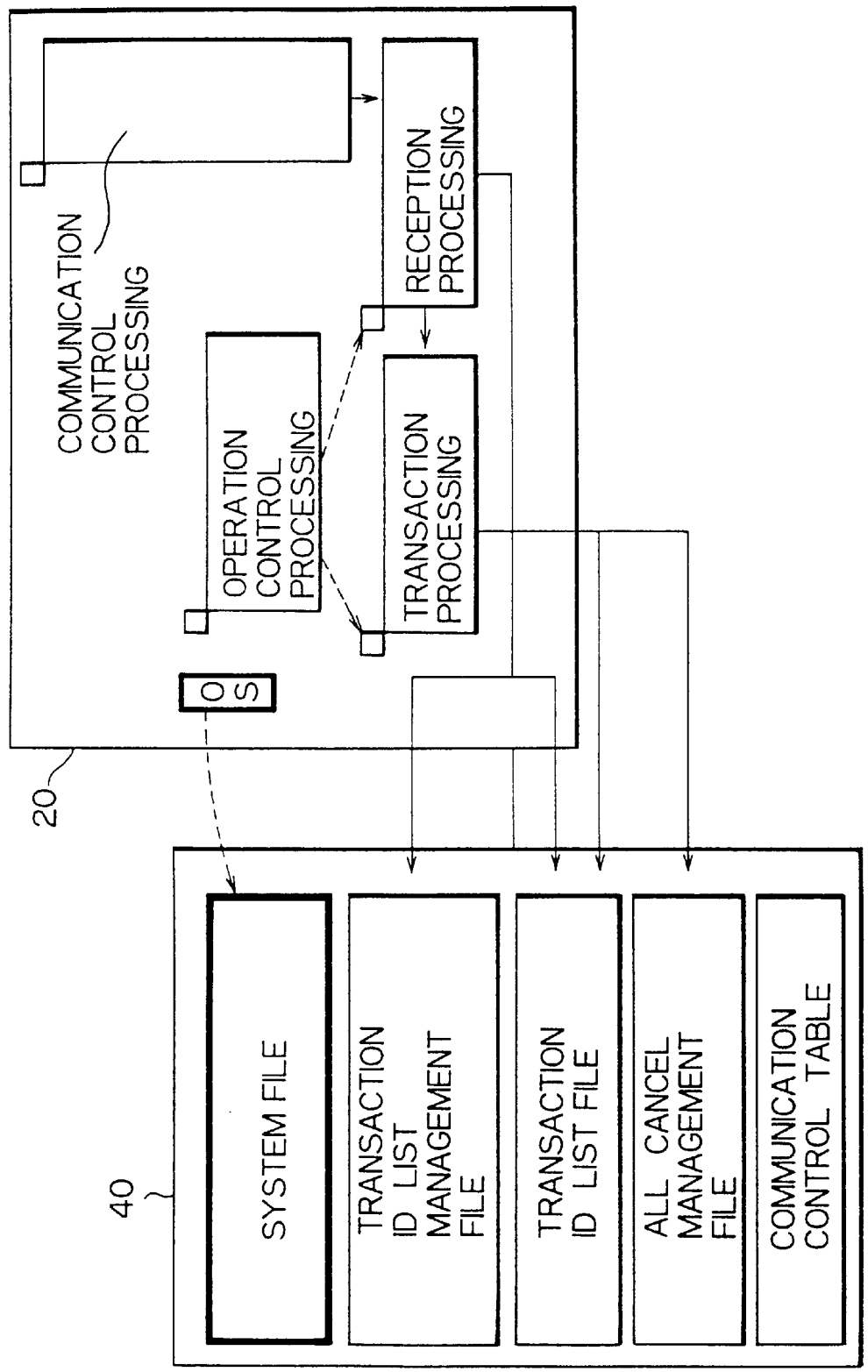
FIG. 5 is a view of the functions of a host system and system storage apparatus.
Figure 6:
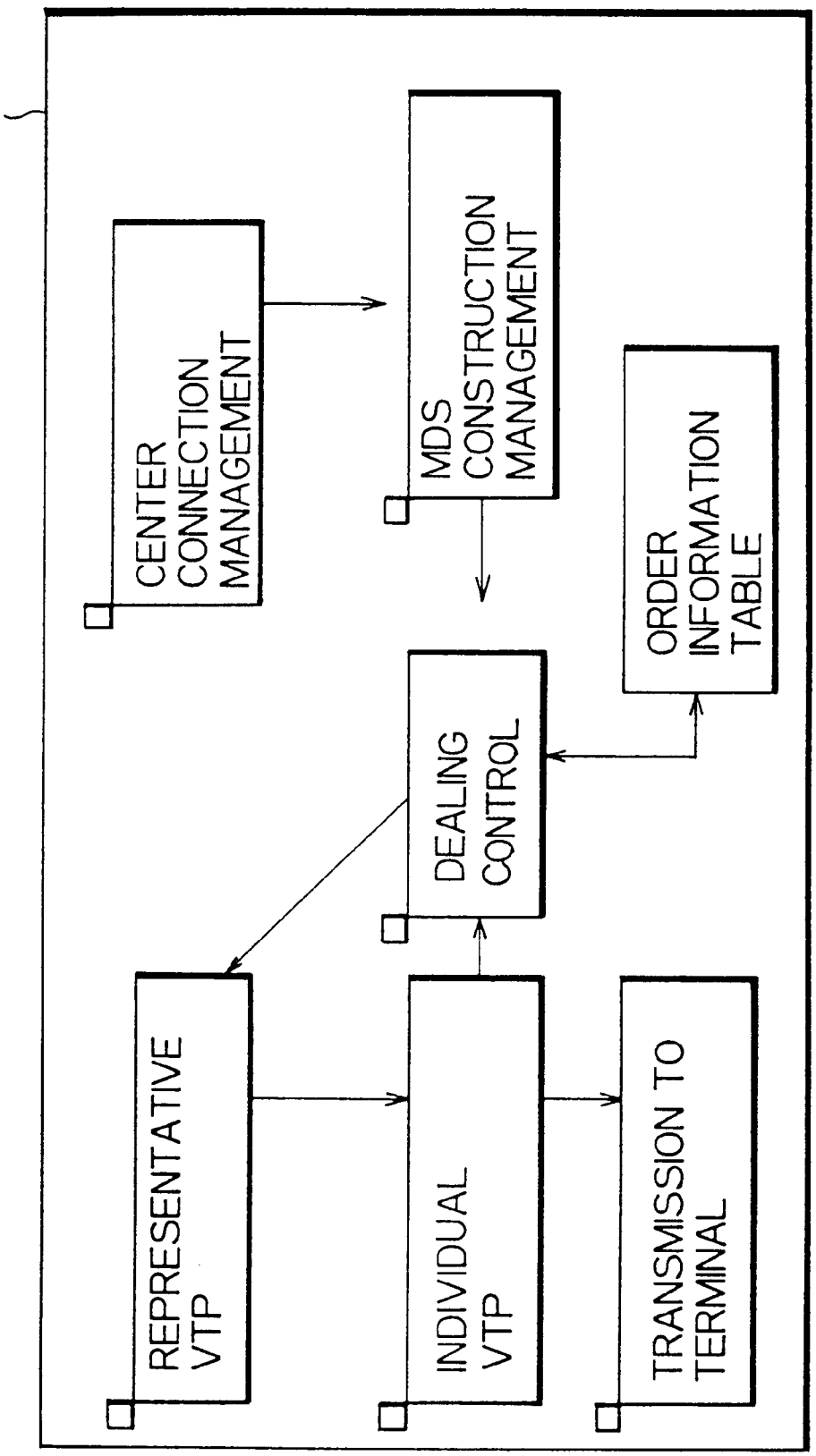
FIG. 6 is a view of the configuration of a program of a subscriber control apparatus.
Figure 7:
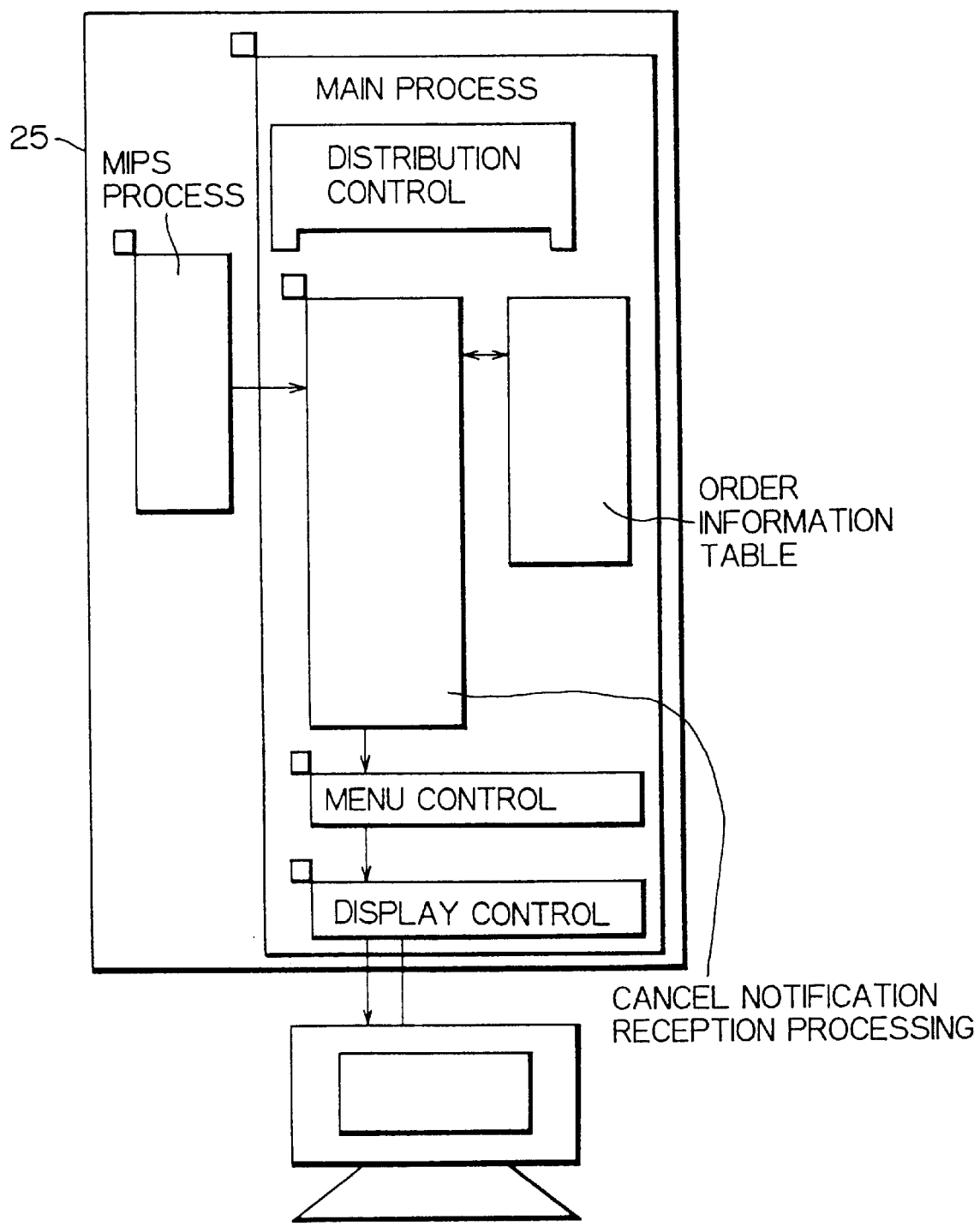
FIG. 7 is a view of the configuration of the program of the terminal.

FIG. 5 is a view of the configuration of the program of the host system 20 (1) and memory structure of the system storage apparatus 40; FIG. 6 is a view of the configuration of a program of a subscriber control apparatus (MDS) 24 (2); and FIG. 7 is a view of the configuration of the program of the terminal 25 (2).

The host system 20, as shown in FIG. 5, is provided with an operating system (OS), a communication control processing function for handling the control of communication, a reception processing function for handling the reception processing, a transaction processing function for handling the transaction processing, and an operation control processing function for handling the control of the operation.

The system storage apparatus 40, as shown in FIG. 5, is provided with a system file for managing the time etc. recorded by the active host system 20, a transaction ID list file for managing the offered orders issued by all terminals 25, a transaction ID list management file for managing information for accessing the transaction ID list file, an all cancel management file for managing canceled offered orders, and a communication control table for managing the communication control information.

The subscriber control apparatus 24 (2), as shown in FIG. 6, is provided with a center connection management function for handling communication processing, an MDS construction management function for handling the management of the construction of the MDS, a dealing control function for handling the control of the dealing, a representative virtual terminal processor for controlling the connection between the subscriber control apparatus and all terminals under it, an individual virtual terminal processor for controlling the connection between the subscriber control apparatus and respective terminal under it according to control by the representative virtual terminal processor, a terminal transmission function for handling the function of transmission to the terminal, and an order information table for managing the offered orders issued by the terminals 25 under the home apparatus.

A terminal 25 (2), as shown in FIG. 7, is provided with an MIPS process function for handling the communication processing, a distribution control function for handling the control of the distribution, a cancel notification reception processing function for handling the processing for reception of a cancel notification, a menu control function for handling control of the menu, a display control function for handling control of the display, and an order information table for managing the offered orders issued by a home apparatus. The distribution control means control distributing messages from the subscriber control apparatus (MDS) to the corresponding processing function.

As explained in FIG. 1, in the present invention, when a fault occurs in the communication system, the offered orders of order side customers already registered through that communication system are canceled automatically, so the problems mentioned earlier are resolved.

Figure 8B:
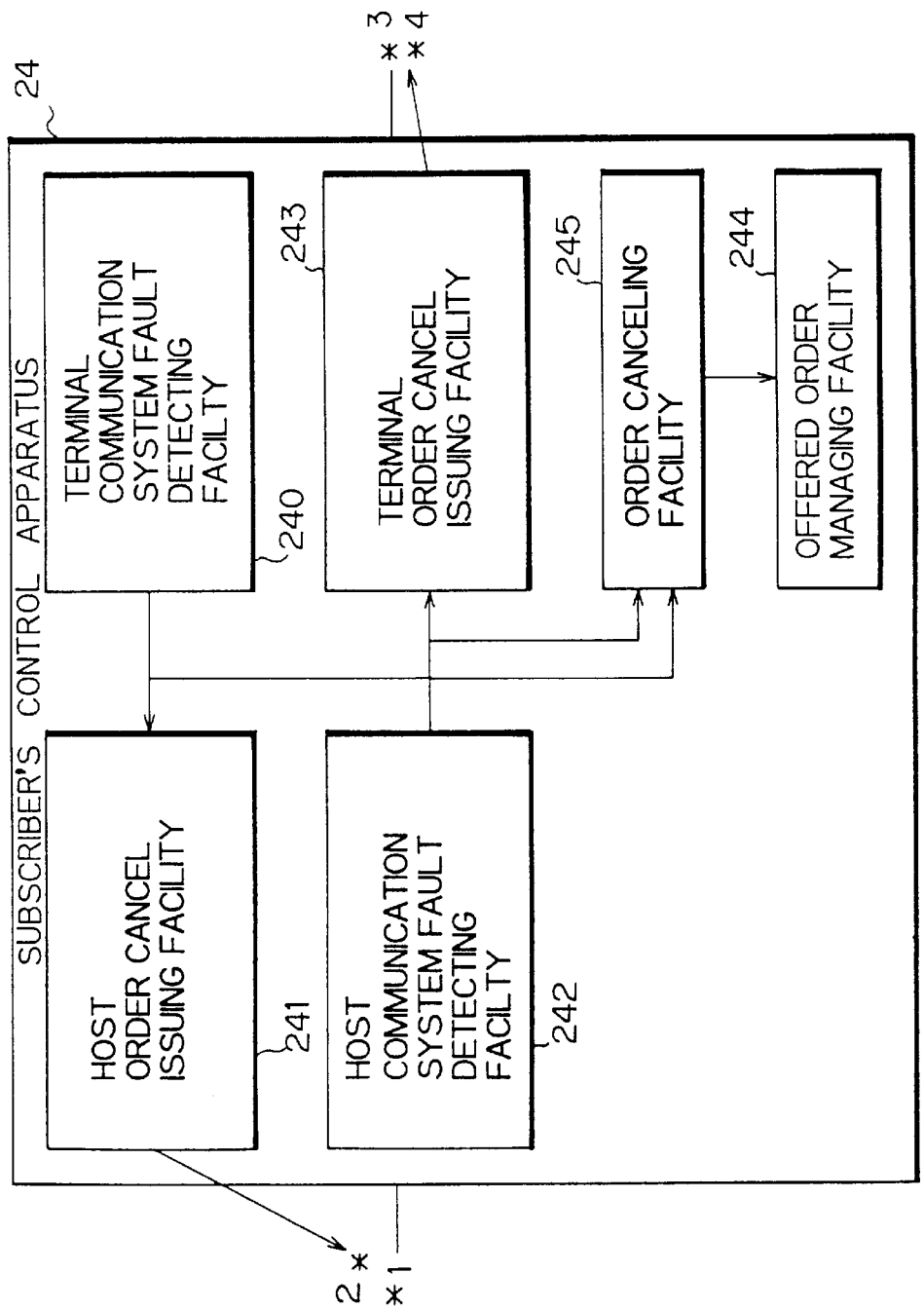
Figure 8C:
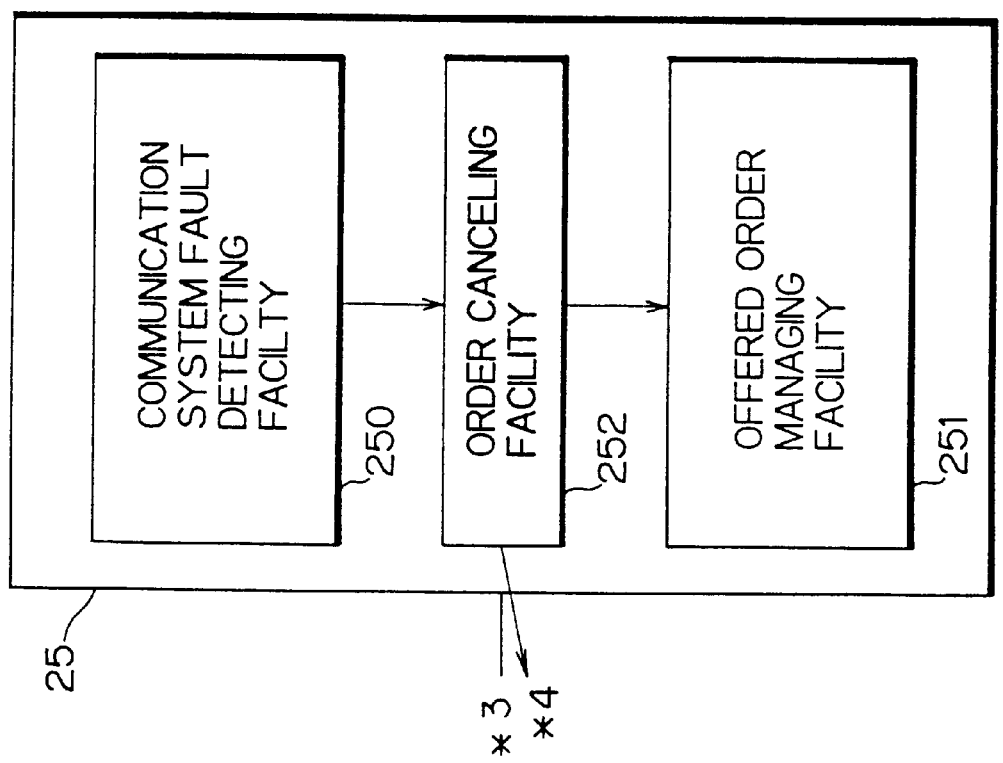

FIGS. 8A, 8B, and 8C illustrate the configuration of facilities provided for realizing the invention in the host system 20, subscriber control apparatus 24, terminal 25, and system storage apparatus 40 comprised as shown in FIG. 5 to FIG. 7.

That is, in FIG. 8A, to realize the invention, the system storage apparatus 40 is provided with an offered order managing facility for managing offered orders of order side customers issued from a terminal 25 (2). The host system 20 is provided with a communication system fault detecting facility 200 for detecting the occurrence of a fault in the communication system with the subscriber control apparatus (MDS) 24 and an order canceling facility 201 for executing processing for canceling offered orders of the offered order managing facility.

In FIG. 8B, the subscriber control apparatus 24 is provided with terminal communication system fault detecting facility 240 for detecting the occurrence of faults in the communication system with a terminal 25, a host order cancel issuing facility 241 for issuing a request for canceling orders to the host system 20, a host communication system fault detecting facility 242 for detecting the occurrence of a fault in the communication system with the host system 20, a terminal order cancel issuing facility 243 for issuing a request for canceling orders to the terminal 25, an offered order managing facility 244 for managing offered orders of order side customers issued from the terminals 25 (FIG. 8C) under the home apparatus, and an order canceling facility 245 for executing processing for canceling offered orders in the offered order managing facility 244.

A terminal 25, further, is provided with a communication system fault detecting facility 250 for detecting the occurrence of a fault in the communication system with the subscriber control apparatus 24, an offered order managing facility 251 for managing the offered orders of order side customers issued from the home apparatus, and an order canceling facility 252 for executing processing for canceling offered orders in the offered order managing facility 251.

Next, a more detailed explanation will be given of the operation of the facilities shown in FIGS. 8A to 8C.

The communication system fault detecting facility 200 of the host system 20 detects the fact that the communication with the subscriber control apparatus 24 has been suspended so as to detect a fault in the communication system with the subscriber control apparatus 24. More specifically, it sends out an inspection signal when (1) it becomes impossible to send a response to an offer of an order from the terminal 25, (2) it becomes impossible to send information such as the rate information to the terminal 25 each predetermined time interval (for example, 2 seconds), (3) there is no response from the terminal 25 to information sent from the home apparatus (20) for more than a predetermined time, and (4) no event comes from the terminal 25 even after the elapse of a predetermined time. When there is no response to this inspection signal, it is judged that a fault has occurred in the communication system between the subscriber control apparatus 24 and the host system 20.

If a fault in the communication system between the subscriber control apparatus 24 and the host system 20 is detected in this way, the communication system fault detecting facility 200 (FIG. 8A) activates the order canceling facility 201.

According to the ABM communication protocol procedure, which is the standard communication protocol procedure of OSI communications, it is judged that the situation is normal and nothing is done when no event is issued from the other party. Here, however, when a fault occurs in the communication system of the electronic dealing system, nothing is done, so the occurrence of the fault cannot be detected. Therefore, to enable use of OSI communications, the communication system fault detecting action mentioned in (4) above is taken.

Figure 9:
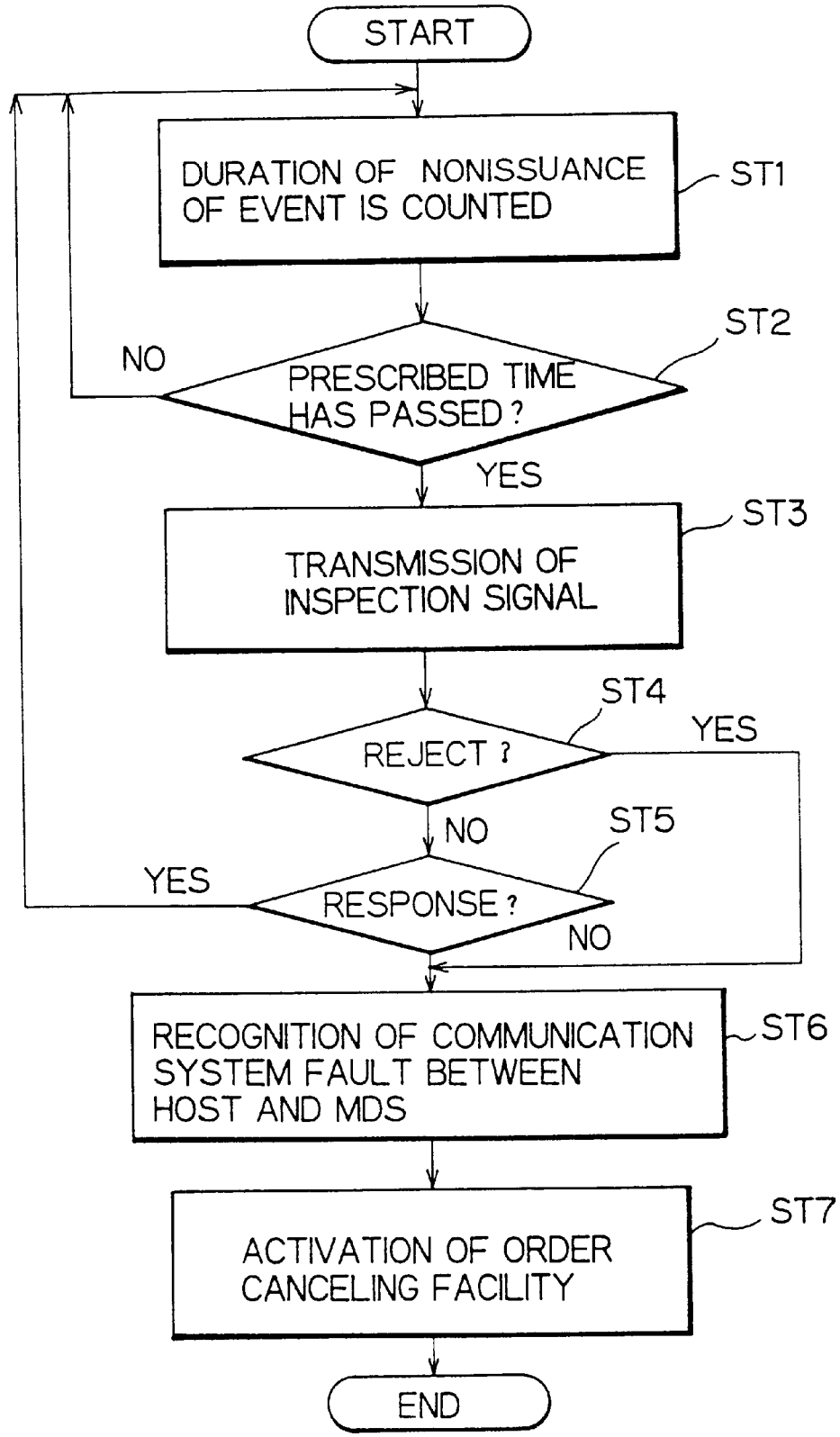
FIG. 9 is a flow chart of the flow of processing executed by a communication system fault detecting facility in a host system.

FIG. 9 illustrates an example of the flow of processing executed by the communication system fault detecting facility 200 in the host system 20 shown in FIG. 8A. That is, the communication system fault detecting facility 200, as shown in the flow of processing, first, at step 1 (ST1), measures the duration during which no event is issued from the subscriber control apparatus (MDS) 24, then, at step 2 (ST2), judges if the duration has exceeded a predetermined time. When it judges that the predetermined time has been exceeded, then at step 3 (ST3) it sends an inspection signal to the subscriber control apparatus 24.

Next, at step 4 (ST4), it is judged if the inspection signal is rejected. When it has been rejected (YES), the routine immediately proceeds to step 6 (ST6), where the occurrence of a fault in the communication system between the subscriber control apparatus 24 and the host system is recognized. On the other hand, when it is not rejected (NO), then at the next step 5 (ST5), it is judged if there has been a response to the inspection signal. When there is no response (NO), the routine proceeds to step 6 (ST6), where it is recognized that a fault has occurred in the communication system between the subscriber control apparatus 24 and the host system. If a fault in the communication system is detected at step 6, the routine proceeds to step 7 (ST7), where the order canceling facility 201 is activated.

Figure 10:
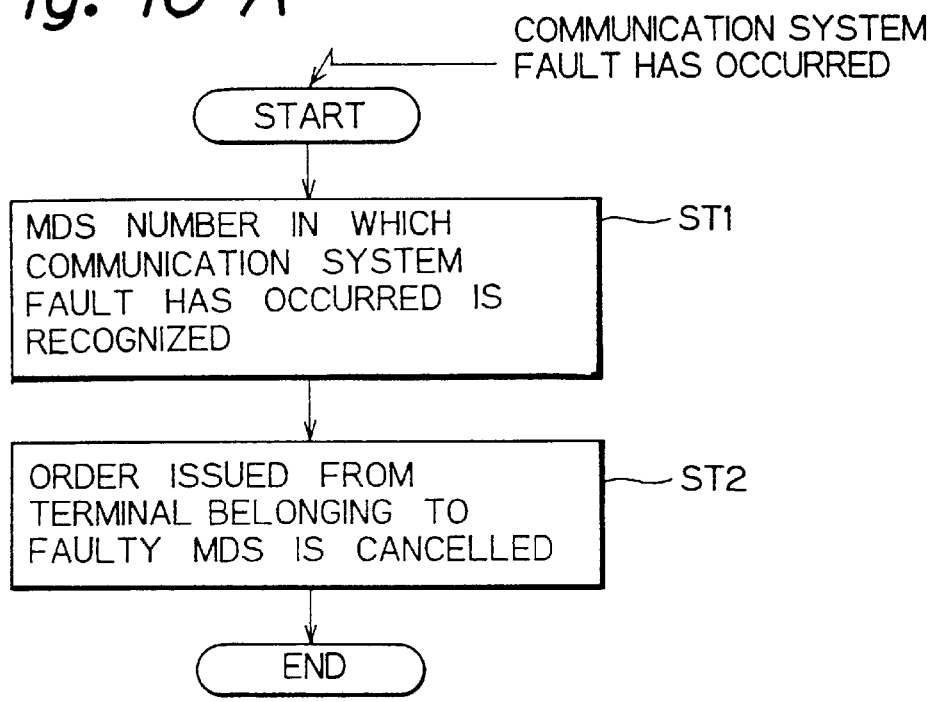
FIGS. 10A and 10B are views of the flow of processing executed by an order canceling facility in a host system.
Figure 10:
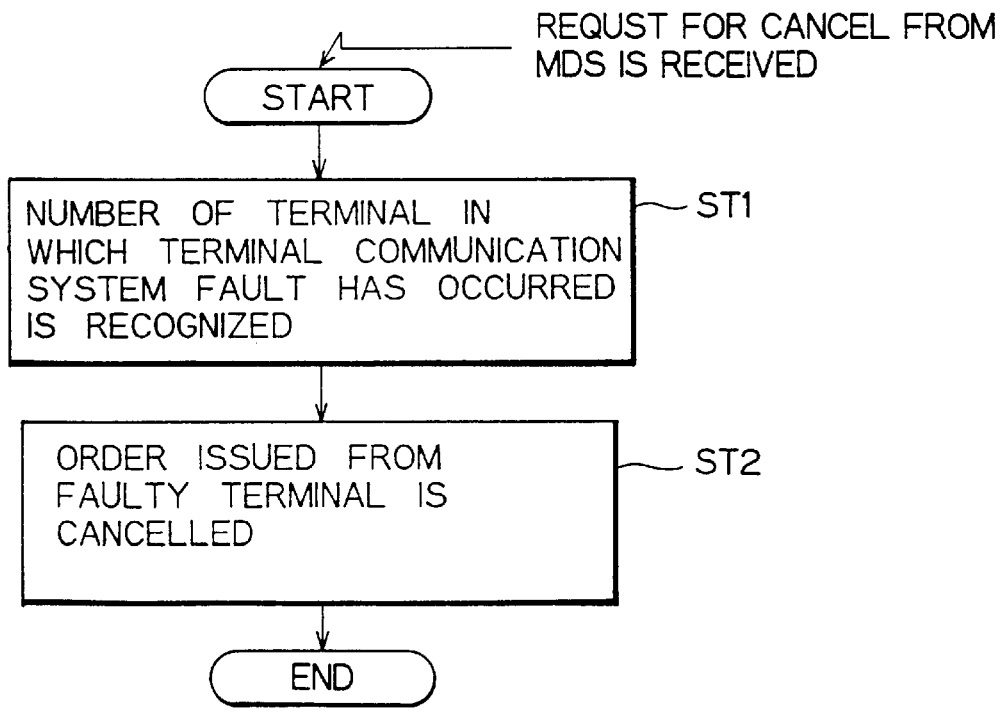

In this way, when activated by the communication system fault detecting facility 200, the order canceling facility 201 in the host system 20 executes processing to cancel the offered orders managed by the offered order managing facility 400 in the system storage apparatus 40. FIG. 10A illustrates an example of the flow of processing executed by the order canceling facility 201. That is, when activated by the communication system fault detecting facility 200, the order canceling facility 201, as shown by the flow of processing in FIG. 10A, first, at step 1 (ST1), recognizes the ID number of the subscriber control apparatus (MDS) 24 in which the fault in the communication system occurred, then, at step 2 (ST2), cancels the offered orders issued by the terminal 25 under the recognized subscriber control apparatus 24 among the offered orders managed by the offered order managing facility 400 in the system storage apparatus 40.

In this way, in the electronic dealing system of the present invention, when a fault occurs in the communication system between the host system 20 and the subscriber control apparatus (MDS) 24, offered orders of the order side customers already registered through the communication system among those offered orders registered in the system storage apparatus 40 are canceled. The order side customers who placed the offered orders are therefore no longer forced to honor disadvantageous transactions caused by news-making events.

On the other hand, the host communication system fault detecting facility 242 (FIG. 8B) of the subscriber control apparatus (MDS) 24 detects the suspension of communication with the host system 20 and thereby detects a fault in the communication system between the host system 20 and the subscriber control apparatus (MDS) 24. More specifically, when an offered order or other request from the terminal 25 (FIG. 8C) cannot be sent or when there is no response from the host system 20 to information sent by the home apparatus (MDS) even after a predetermined time, it is judged that communication is disabled between the host system 20 and the subscriber control apparatus (MDS). Next, the flow of processing of FIG. 11 is executed so as to discriminate if this disabled state of communication is due to a fault in the communication system or is due to a fault in the host system.

Figure 11:
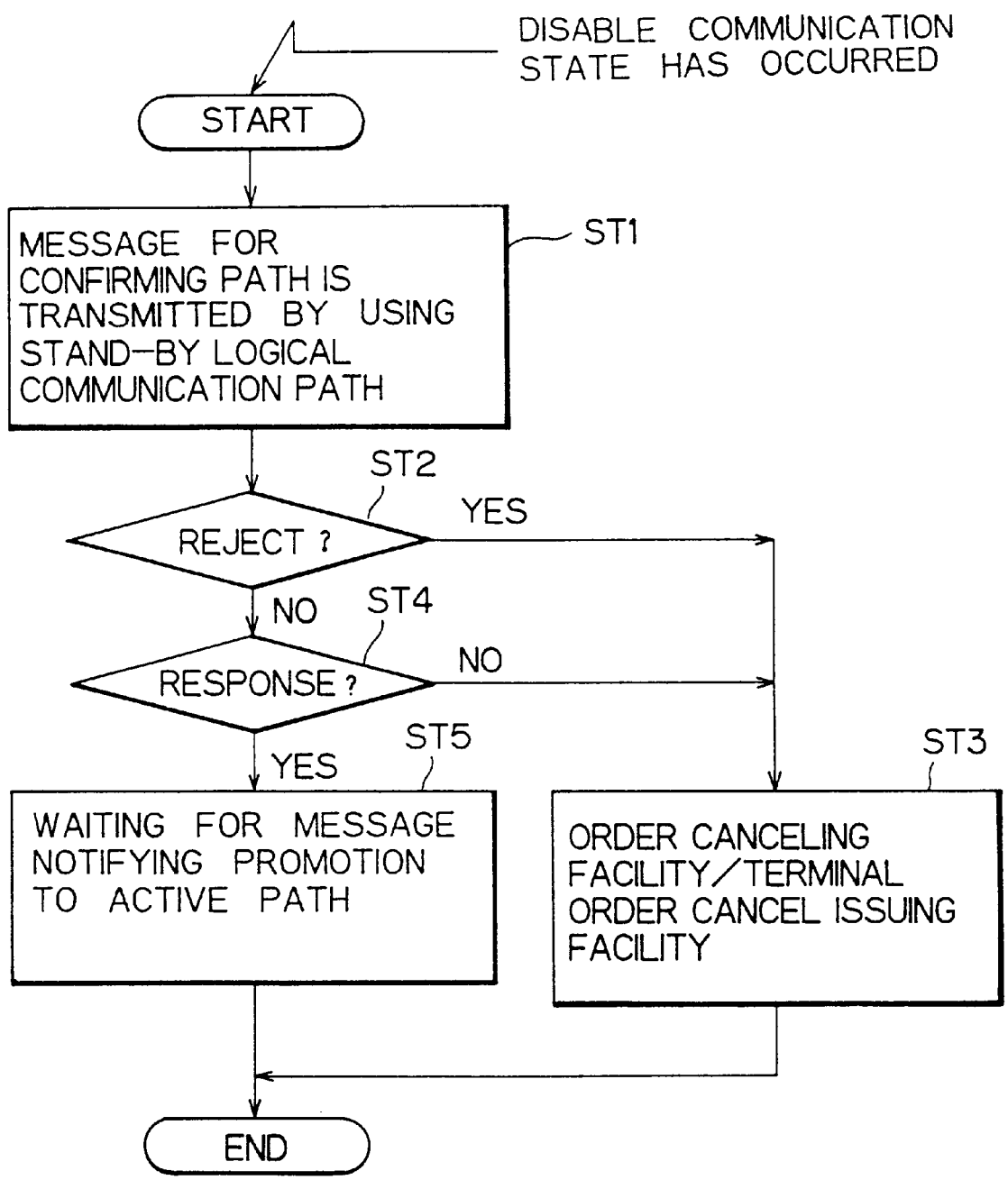
FIG. 11 is a view of an example of the flow of processing executed by a host communication system fault detecting facility in a subscriber control apparatus.

More specifically, if the above-mentioned disabled state of communication is detected, then, as shown in the flow of processing of FIG. 11, first, at step 1 (ST1), the stand-by logical communication path (FIG. 1) is used to send a path confirmation message to the stand-by host system 20b, then, at step 2 (ST2), it is judged if the path confirmation message has been rejected or not. If rejected (YES), it is judged that the fault is in the communication system or the fault in the host system 20 as a whole and the routine proceeds to step 3 (ST3), where the terminal order cancel issuing facility 243 and the order canceling facility 245 are activated.

On the other hand, if not rejected at step 2 (NO), the routine proceeds to step 4 (ST4), where it is judged if there is a response to the path confirmation message. If there is no response (NO), the routine proceeds to the above-mentioned step 3, where the terminal order cancel issuing facility 243 and the order canceling facility 245 are activated. If there is a response (YES), it is judged that the fault is in the active host system 20a and the routine proceeds to step 5 (ST5). Here, the previous stand-by host system 20b is switched to the active host system, then the active path promotion message sent from the system 20b is awaited. If the subscriber control apparatus (MDS) 24 recognizes that this active path promotion message has been sent, then processing for communication is executed using the previous stand-by logical communication path as the active logical communication path.

In this way, if activated by the host communication system fault detecting facility 242, the order canceling facility 245 executes processing to cancel the offered orders managed by the offered order managing facility 244 and thus cancels the offered orders already issued to the host system 20. On the other hand, if activated by the host communication system fault detecting facility 242 in this way, the terminal order cancel issuing facility 243 issues a request for cancellation of orders to the order canceling facility 252 (FIG. 8C) in the terminal 25, whereby the offered orders managed by the offered order managing facility 251 in the terminal 25 (issued by the terminal 25) are canceled.

That is, when a fault occurs in a communication system between the host system 20 and the subscriber control apparatus (MDS) 24, as mentioned above, the host system 20 cancels the offered orders already registered through the communication system, so to ensure a match between the two (20 and 24), the order canceling facility 245 in the subscriber control apparatus 24 (FIG. 8B) cancels the offered orders managed in the subscriber control apparatus 24, and the order canceling facility 252 (FIG. 8C) in the terminal 25 cancels the offered orders managed in the terminal 25. When a fault occurs in the host system 20 as a whole, the offered orders are also canceled since all the offered orders are canceled when a general fault occurs.

On the other hand, the terminal communication system fault detecting facility 240 (FIG. 8B) in the subscriber control apparatus (MDS) 24 detects the suspension of the communication with the terminal 25 (FIG. 8C) so as to detect a fault in the communication system with the terminal 25. More specifically, it sends out an inspection signal when (1) it becomes impossible to send a response to an offer of an order from the terminal 25, (2) it becomes impossible to send information such as the rate information to the terminal 25 each predetermined time interval (for example, 2 seconds), (3) there is no response from the terminal 25 to information sent from the home apparatus (24) for more than a predetermined time, and (4) no event comes from the terminal 25 even after the elapse of a predetermined time. When there is no response to this inspection signal, it is judged that a fault has occurred in the communication system between the terminal 25 and the subscriber control apparatus (MDS) 24.

If a fault in the communication system between the terminal 25 and the subscriber control apparatus (MDS) 24 is detected in this way, the terminal communication system fault detecting facility 240 (FIG. 8B) activates the host order cancel issuing facility 241 and the order canceling facility 245.

Figure 12:
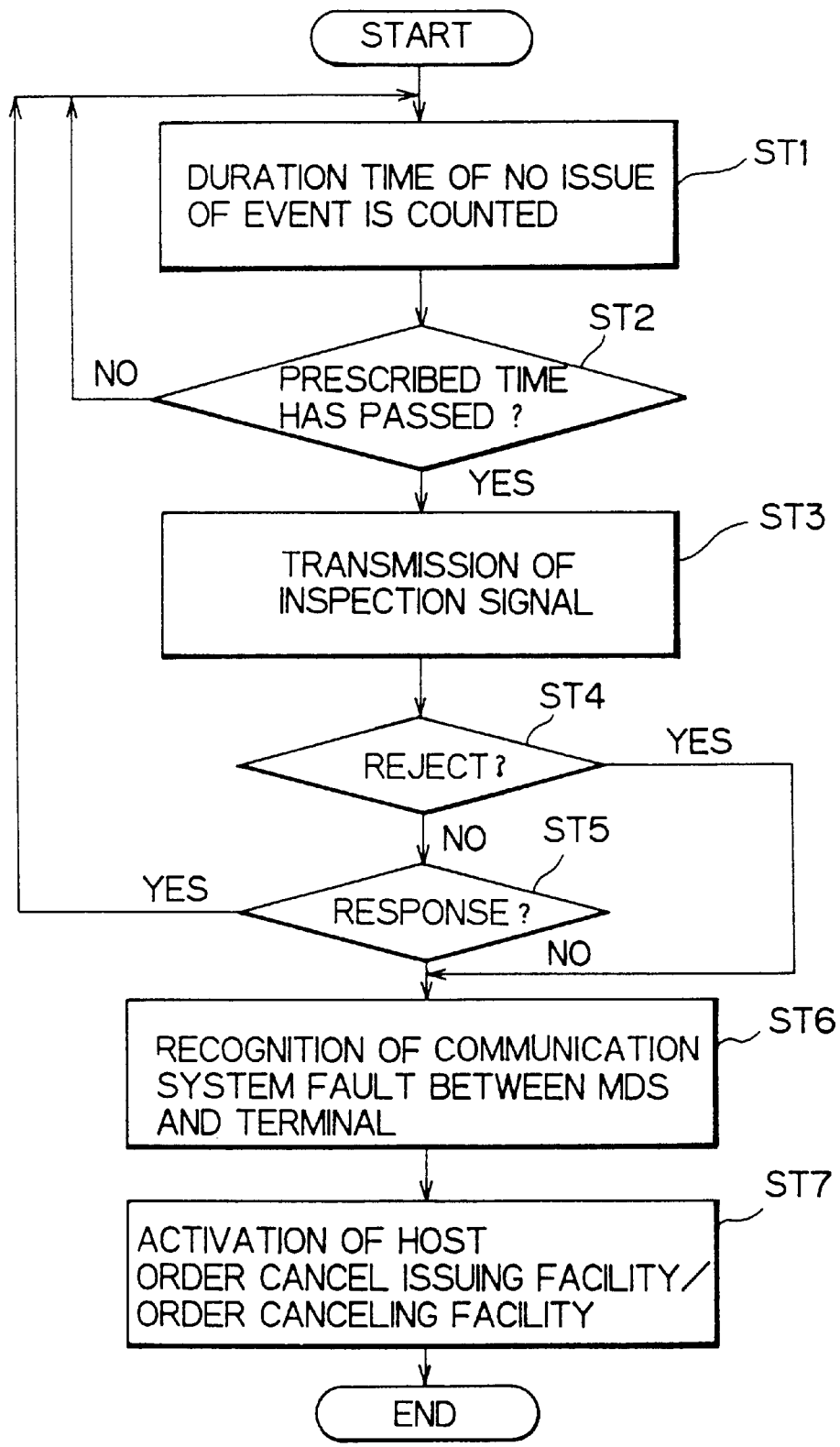
FIG. 12 is a view of an example of the flow of processing executed by a terminal communication system fault detecting facility in a subscriber control apparatus.

FIG. 12 illustrates an example of the flow of processing executed when the method of detection of the above (4) is adopted. That is, the terminal communication system fault detecting facility 240, as shown in the flow of processing, first, at step 1 (ST1), measures the duration during which no event is issued from the terminal 25, then, at step 2 (ST2), judges if the duration has exceeded a predetermined time. When it judges that the predetermined time has been exceeded, then at step 3 (ST3) it sends an inspection signal to the terminal 25. Next, at step 4 (ST4), it is judged if the inspection signal is rejected. When it has been rejected (YES), the routine immediately proceeds to step 6 (ST6), where the occurrence of the fault in the communication system between the terminal 25 and the subscriber control apparatus (MDS) 24 is recognized. On the other hand, when it is not rejected (NO), then at the next step 5 (ST5), it is judged if there has been a response to the inspection signal. When there is no response (NO), the routine proceeds to step 6 (ST6), where it is recognized that a fault has occurred in the communication system between the terminal 25 and the subscriber control apparatus (MDS) 24. If a fault in the communication system is detected at step 6, the routine proceeds to step 7 (ST7), where the host order cancel issuing facility 241 and the order canceling facility 245 are activated.

In this way, when activated by the terminal communication system fault detecting facility 240, the host order cancel issuing facility 241 issues to the order canceling facility 201 in the host system 20 a request for canceling the offered orders. On the other hand, when activated by the terminal communication system fault detecting mechanism 240 in this way, the order canceling facility 245 executes processing to cancel the offered orders managed by the offered order managing facility 244 and thus cancels the offered orders issued by the terminal 25 connected to the faulty communication system.

If a request for cancellation is received from the host order cancel issuing facility 241, the order canceling facility 201 of the host system 20 executes processing to cancel the offered orders already issued by the terminal 25 connected to the faulty communication system among the offered orders managed by the offered order managing facility 400 in the system storage apparatus 40. FIG. 10B illustrates an example of the flow of processing executed by the order canceling facility 201 (FIG. 8A) at this time. More specifically, when the order canceling facility 201 receives a request for cancellation from the host order cancel issuing facility 241 (FIG. 8B) of the subscriber control apparatus 24, as shown by the flow of processing of FIG. 10B, first, at step 1 (ST1), it recognizes the ID number of the terminal 25 experiencing the fault in the communication system, then at step 2 (ST2) cancels the offered orders issued by the recognized terminal 25 among the offered orders managed by the offered order managing facility 400 in the system storage apparatus 40.

In this way, in the electronic dealing system of the present invention, when a fault occurs in the communication system between the terminal 25 and the subscriber control apparatus (MDS) 24, offered orders of the order side customers already registered through the communication system among those offered orders registered in the system storage apparatus 40 are canceled. The order side customers who placed the offered orders are therefore no longer forced to honor disadvantageous transactions caused by news-making events.

On the other hand, the communication system fault detecting facility 250 (FIG. 8C) of the terminal 25 detects the suspension of communication with the subscriber control apparatus 24 and thereby detects a fault in the communication system between the subscriber control apparatus (MDS) 24 and terminal 25. When a fault in the communication system is detected, it activates the order canceling facility 252. The processing for detecting a fault in the communication system is executed, more specifically, when an offered order or other request to the subscriber control apparatus 24 cannot be sent or when there is no response from the subscriber control apparatus 24 to information sent by the home apparatus (25) even after a predetermined time.

In this way, if the order canceling facility 252 is activated by the communication system fault detecting facility 250, it performs processing to cancel offered orders managed by the offered order managing facility 251.

That is, when a fault occurs in the communication system between the subscriber control apparatus 24 and a terminal 25, as mentioned earlier, the host system cancels the orders issued by the terminal 25 connected to that communication system in accordance with cancellation requests from the subscriber control apparatus 24, so to match with this, the order canceling facility 252 of the terminal 25 performs processing to cancel the offered orders managed by the terminal 25 as well.

As explained above, according to the present invention, when a fault occurs in a communication system constituting the electronic dealing system, the orders placed by order side customers already registered through that communication system are automatically canceled, so disadvantageous orders are no longer forced on order side customers who place orders even if there is a news-making event, in the time until the fault in the communication system is eliminated.

We claim:

1. An electronic transacting system which electronically performs matching processing of information on transaction orders placed by order side customers and information on transactions placed by hit side customers so as to establish transactions, comprising:
   a host system:
   a plurality of terminal systems, each said terminal system having an hierarchial structure comprising a plurality of terminal units connected in cascade by respective communication lines from a lowest terminal unit to a highest terminal unit closest to the host system, each communication line connecting two adjacent terminal units;
   a first detecting unit in the host system detecting an occurrence of a fault in a communication path between the host system and each of the plurality of terminal systems;
   a canceling unit in the host system canceling orders of the order side customers issued from the terminal system connected to the communication path when said first detecting unit detects that a fault in the communication path has occurred;
   a second detecting unit in each terminal unit detecting the occurrence of a fault in the respective communication line connecting the terminal unit to the adjacent, lower terminal unit; and
   an issuing unit issuing to the host system a request for canceling offered orders of order side customers issued from the lower terminal unit when the second detecting unit detects the occurrence of a fault in the respective communication line.

2. An electronic transacting system as set forth in claim 1, wherein said first detecting unit detects a fault in the communication path on the basis of a response during processing for communicating with the terminal system, monitors the duration during which no event is issued from the terminal system and, when that duration is more than a predetermined time, sends an inspection signal to the terminal system and detects a fault in the communication path on the basis of the response to that transmission.

3. An electronic transacting system as set forth in claim 2, wherein:
   said host system is of a duplex construction comprising active and stand-by host systems respectively connected to each terminal system by active and stand-by logical communication paths; and
   the highest terminal unit of each terminal system, connected to the host system, further comprising:
   (1) a third detecting unit which detects an occurrence of a disabled communication state between the active host system and the highest terminal unit and responsive thereto, transmits to the stand-by host system, via the stand-by logical communication path, a path confirmation message, and
   (ii) a discriminating unit which discriminates the class of the disabled communication state on the basis of the response to the path confirmation message from the stand-by host system.

4. An electronic transacting system as set forth in claim 3, wherein the stand-by logical communication path is established at the time of startup of the electronic transaction system.

5. An electronic transacting system as set forth in claim 1, wherein said second detecting unit of each terminal unit detects a fault in the communication line between the terminal unit and the adjacent terminal unit on the basis of response processing during processing for establishing a communication therebetween, monitors the duration during which no event is issued from the adjacent, lower side terminal unit and, when that duration is more than a predetermined time, transmits an inspection signal to the adjacent, lower side terminal unit to detect a fault in the communication line on the basis of the response to that transmission.

6. An electronic transacting system as set forth in claim 5, wherein:
said host system is of a duplex construction comprising active and stand-by host systems respectively connected to each terminal system by active and stand-by logical communication paths: and
the highest terminal unit of each terminal system, connected to the host system, is further provided with a discriminating unit operative upon the first detecting unit detecting an occurrence of a disabled communication state between the active host system and the highest terminal unit to transmit and with a discriminating unit stand-by logical communication path, a path confirmation message discriminating the class of the disabled communication state.

7. An electronic transacting system as set forth in claim 6, wherein the stand-by logical communication path is established at the time of startup of the electronic transaction system.

8. An electronic transacting system as set forth in claim 1, wherein:
said host system is of a duplex construction comprising active and stand-by host systems respectively connected to each terminal system by active and stand-by logical communication paths; and
the highest terminal unit of each terminal system, connected to the host system, further comprising:
(1) a third detecting unit which detects an occurrence of a disabled communication state between the active host system and the highest terminal unit and responsive thereto, transmits to the stand-by host system, via the stand-by logical communication path, a path confirmation message, and
(ii) a discriminating unit which discriminates the class of the disabled communication state on the basis of the response to the path confirmation message from the stand-by host system.

9. An electronic transacting system as set forth in claim 8, wherein the stand-by logical communication path is established at the time of startup of the electronic transaction system.

10. An electronic transacting system as set forth in claim 1, wherein said host system further comprises an operating system, a communication control processing function handling the control of communication, a reception processing function handling the reception processing, a transaction processing function handling the transaction processing, and an operation control processing function handling the control of the operation.

11. An electronic transacting system as set forth in claim 10, wherein said host system cooperates with a system storage apparatus and said system storage apparatus is provided with a system file managing the time recorded by the active host system, a transaction ID list file managing the offered orders issued by all terminals in the terminal system, a transaction ID list management file managing information for accessing the transaction ID list file, an all cancel management file managing canceled offer orders, and a communication control table managing the communication control information.

12. An electronic transacting system as set forth in claim 11, wherein said system storage apparatus further comprises an offered order managing facility managing offered orders of order side customers issued from a terminal under the various said functions.

13. An electronic transacting system as set forth in claim 12, wherein said host system further comprises a communication system fault detecting facility detecting the occurrence of a fault in the communication system with the subscriber control apparatus and an order canceling facility executing processing for canceling offered orders of the offered order managing facility under the various above functions.

14. An electronic transacting system as set forth in claim 1, wherein each said terminal system further comprises:
a subscriber control apparatus and terminal units accommodated thereby;
said subscriber control apparatus being provided with a center connection management function handling communication processing, an management and distribution server (MDS) construction a management function handling the management of the construction of the MDS, a transacting control function handling transacting control, a representative virtual terminal processor, an individual virtual terminal processor, a terminal transmission function handling the function of transmission to the terminal units, and an order information table managing the offer orders issued by the terminal units accommodated by the above subscriber control apparatus; and
each of the terminal units is provided with a communication process function handling the communication protocol between the subscriber control apparatus and the terminal units accommodated thereby, a distribution control function distributing messages from said subscriber control apparatus to a corresponding process function, a cancel notification reception processing function handling the processing for reception of a cancel notification, a menu control function for handling control of the menu, an image control function handling control of the image, and an order information table managing the offer orders issued by the above subscriber control apparatus.

15. An electronic transacting system as set forth in claim 14, wherein said subscriber control apparatus further comprises a terminal communication system fault detecting facility detecting the occurrence of faults in the communication system with the terminal, a host order cancel issuing facility issuing a request for canceling orders to the host system, a host communication system fault detecting facility detecting the occurrence of faults in the communication system with the host system, a terminal order cancel issuing facility issuing a request for canceling orders to the terminal, an offered order managing facility managing offered orders of order side customers issued from the terminal under the control apparatus, and an order canceling facility executing processing for canceling offered orders in the offered order managing facility.

16. An electronic transacting system as set forth in claim 14, wherein said terminal further comprises a communication system fault detecting facility detecting the occurrence of a fault in the communication system with the subscriber control apparatus, an offered order managing facility managing the offered orders of order side customers issued from the control apparatus, and an order canceling facility executing processing for canceling offered orders in the offered order managing facility under the various above functions.

17. An electronic transacting system electronically performing matching processing of information on transaction orders placed by first customers and information on transactions placed by second customers so as to establish transactions, comprising:

a first detecting unit in a host system detecting an occurrence of a fault in a communication path connected to a terminal system;

a cancelling unit in the host system cancelling orders of first customers issued from one of the terminal systems connected to the communication path when said first detecting unit detects that a fault in the communication path has occurred; and each said terminal system having an hierarchial structure comprising a plurality of terminal units connected in cascade, from a lowest terminal unit to a highest terminal unit closest to the host system, by respective communication lines, each communication line connecting two adjacent terminal units;

a second detecting unit in each said terminal unit detecting the occurrence of a fault in the respective communication line connecting the terminal unit to the adjacent, lower terminal unit; and an issuing unit issuing to the host system a request for canceling offered orders of order side customers issued from the lower terminal unit when the second detecting unit detects the occurrence of a fault in the respective communication line.

* * * * *